United States Patent [19]

Sharp

[11] Patent Number: 5,597,948
[45] Date of Patent: Jan. 28, 1997

[54] STORAGE TANK SYSTEM WITH INDEPENDENT MONITORING OF RIBS AND TANK WALL

[76] Inventor: Bruce R. Sharp, 126 Leland Way, Marco Island, Fla. 33937

[21] Appl. No.: 327,592

[22] Filed: Oct. 24, 1994

[51] Int. Cl.[6] ............................................. G01M 3/04
[52] U.S. Cl. .......................... 73/49.2; 220/565; 340/605
[58] Field of Search ................................. 220/565, 654, 220/465, 426, 445; 73/49.2; 340/605

[56] References Cited

U.S. PATENT DOCUMENTS

| | | | |
|---|---|---|---|
| 4,739,659 | 4/1988 | Sharp | 73/49.2 |
| 4,869,386 | 9/1989 | Sharp | 220/5 A |
| 4,875,361 | 10/1989 | Sharp | 73/49.2 |
| 4,925,046 | 5/1990 | Sharp | 220/5 A |
| 4,951,844 | 8/1990 | Sharp . | |
| 4,974,739 | 12/1990 | Gelin . | |
| 5,020,358 | 6/1991 | Sharp | 73/49.2 |
| 5,054,645 | 10/1991 | Sharp | 220/445 |
| 5,095,737 | 3/1992 | Sharp | 73/49.2 |
| 5,102,481 | 4/1992 | Sharp | 156/69 |
| 5,167,142 | 12/1992 | Sharp . | |
| 5,259,895 | 11/1993 | Sharp | 156/69 |
| 5,303,840 | 4/1994 | Sharp | 220/469 |
| 5,320,247 | 6/1994 | Sharp | 220/654 |

Primary Examiner—Hezron E. Williams
Assistant Examiner—Jay L. Politzer
Attorney, Agent, or Firm—Charles R. Wilson

[57] ABSTRACT

A double wall ribbed storage tank system is provided with the capability of independent monitoring of support rib areas and secondary containment areas of the tank system. The storage tank system comprises (a) an inner storage tank for primary containment of stored liquid with a set of support ribs for strengthening purposes, (b) an outer wall over the inner tank for secondary containment of the stored liquid, (c) rib communication means connecting together the support rib areas, (d) wall communication means connecting together secondary containment areas of the inner storage tank and outer wall, and (e) a monitoring station operably associated with the rib and wall communication means. Any structural damage to a support rib, inner storage tank wall or outer wall is detectable and generally located by the monitoring station.

15 Claims, 4 Drawing Sheets

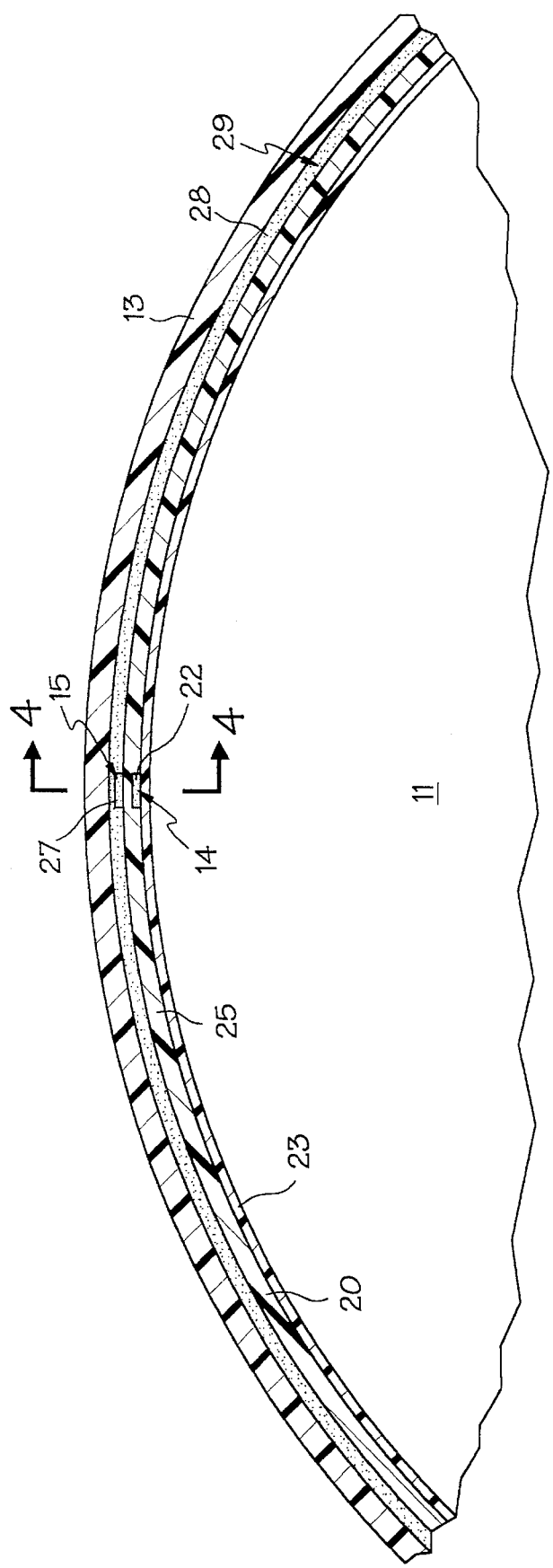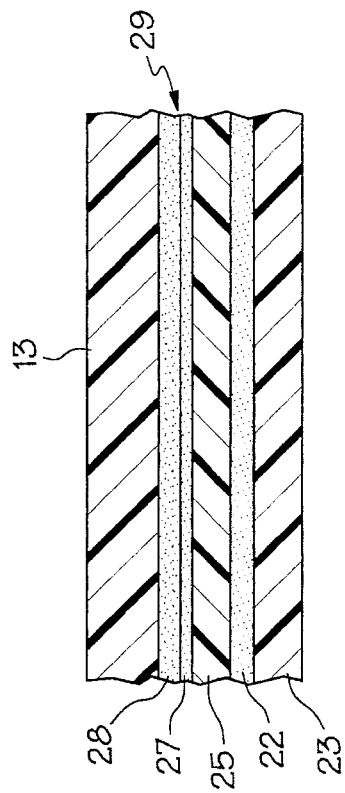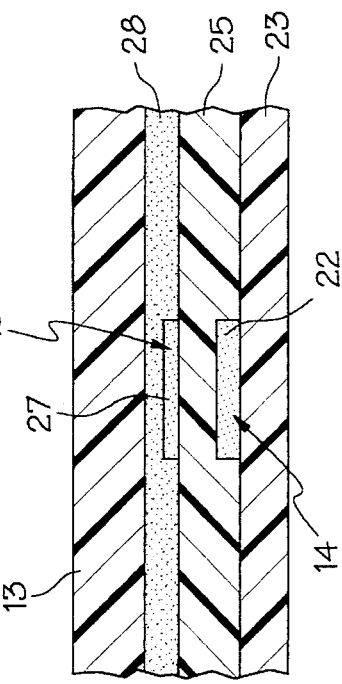

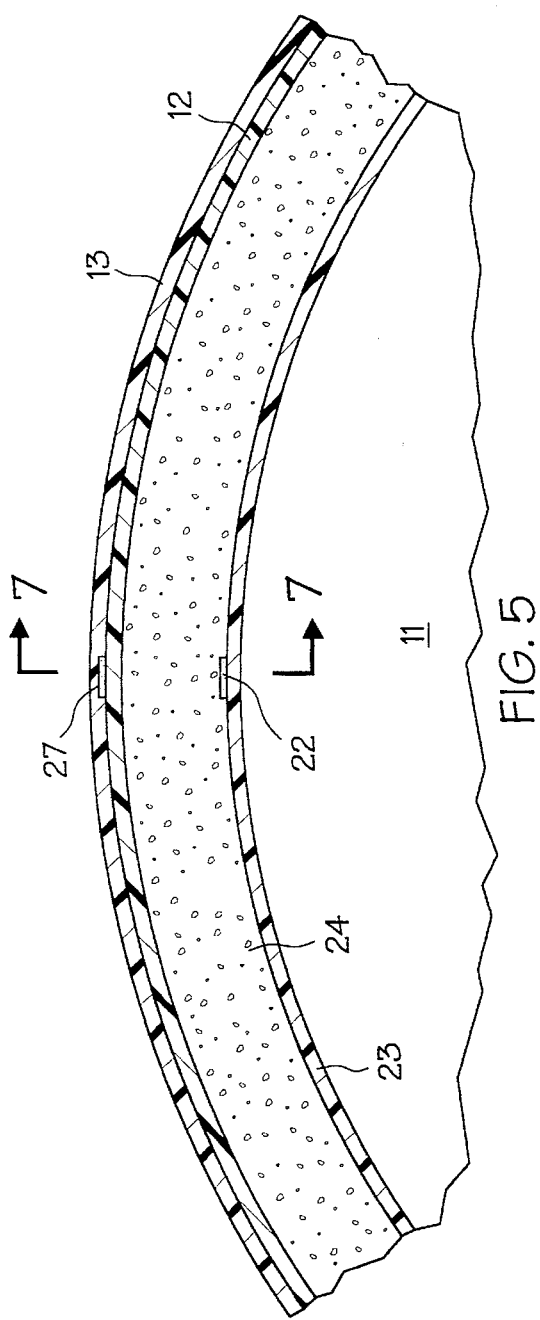
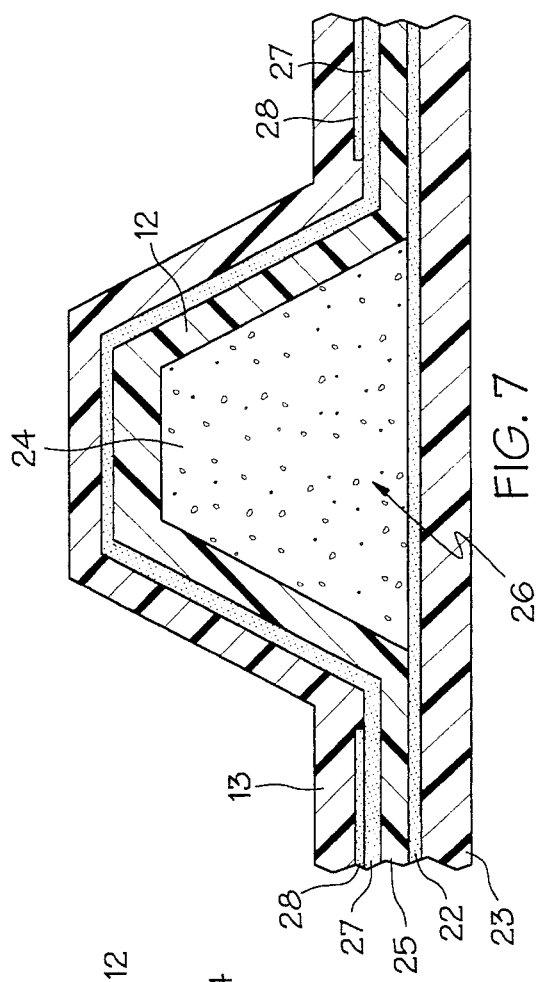
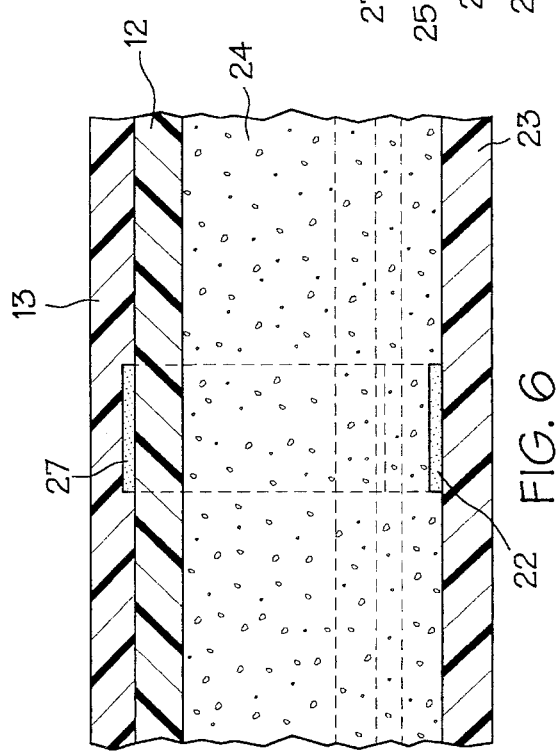

STORAGE TANK SYSTEM WITH INDEPENDENT MONITORING OF RIBS AND TANK WALL

This invention relates to a double wall ribbed storage tank system. More particularly, the invention relates to a double wall ribbed storage tank system having the capability of independent monitoring of support rib areas and secondary containment areas.

BACKGROUND OF THE INVENTION

Storage tanks which are being currently manufactured for underground storage purposes are double walled. An inner tank is a source of primary containment for the stored liquid. An outer wall serves as a secondary containment for the stored liquid in the event the inner tank develops a hole or crack which allows the liquid to escape.

A predominate number of the double walled storage tanks offered for sale are made from a fibrous reinforced resinous material and are commonly referred to in the industry as a FRP tank. Such tanks are light weight when compared to steel tanks. They usually have a cylindrical-shaped side wall and have domed end walls. Sufficient wall strength of the FRP tanks is achieved by the use of spaced support ribs extending circumferentially around the cylindrical-shaped side wall. The support ribs significantly increase the ability of the tank to withstand internal load forces from the stored liquid and external load forces from being buried underground.

It has been found that double walled storage tanks, while more reliable than single walled tanks, do occasionally fail. Any wall failure can cause extensive environmental damage if not detected early and promptly repaired. Leak detection means which are in communication with a space between the inner and outer walls are capable of detecting liquid and/or vapor, a change of pressure, a change of liquid level, or some other characteristic and then signaling that a potential problem exists. Any small hole or crack in an interior wall area normally can be detected and repaired prior to any significant liquid loss. Structural damage in this part of the tank normally starts small and stays small for a sufficient time to allow detection, removal of liquid and possible repair. However, a structural failure in the support rib area of the tank sometimes means a collapse of the tank is imminent. More radical remedial action may be required to prevent a possible total tank collapse and lost of several thousand gallons of stored liquid into the soil and natural aquifers of the area.

Known double wall storage tank systems typically do have leak detection means. However, any signal from the leak detection means merely indicates there is a structural failure somewhere in the tank system. The type or degree of failure is normally not known. U.S. Pat. No. 4,951,844 does disclose a double walled storage tank system wherein a flat end wall area is separately monitored from the side wall area of the tank. The flat end wall area is a vulnerable area of many tanks and added strength in the area coupled with independent monitoring of it is of benefit. However, the support rib areas of a tank are also a critical area where a structural failure can be costly.

In accord with a need for an improved tank design with greater capability of detecting specific structural damage, there has now been developed a double walled ribbed storage tank system design having the capability of independent monitoring of support rib areas and secondary containment areas. The tank system solves a problem which has the potential for significant environmental consequences in a very economical and reliable manner.

SUMMARY OF THE INVENTION

A double wall ribbed storage tank system is made in a manner whereby independent monitoring of support rib areas and secondary containment areas is possible. The storage tank system has an inner storage tank with a side wall and end walls. The inner storage tank provides primary containment for stored liquid. Support ribs extend around the side walls to strengthen the inner and outer walls against internal and external load forces. An outer wall extends over the inner tank to create secondary containment areas between adjacent support ribs and in the end wall areas for the stored liquid. The tank system also has rib communication means operably associated with the support rib areas and wall communication means operably associated with the secondary containment areas. Any structural damage to the support ribs, inner tank or outer wall is detected and transmitted through either the rib communication means or the wall communication means to a monitoring station. The tank system owner is alerted to the structural damage and is informed as to the general locale of the damage.

BRIEF DESCRIPTION OF THE DRAWINGS

FIG. 2 is a partial side view in section of a wall area of the double wall ribbed storage tank system of FIG. 1 taken along line 2—2 thereof.

FIG. 3 is an enlarged view of a part of FIG. 2 showing in detail rib and wall communication means.

FIG. 4 is a partial front view in section of the double wall ribbed storage tank system taken along line 4—4 of FIG. 2.

FIG. 5 is a partial side view in section of a support rib area of the double wall ribbed storage tank system of FIG. 1 taken along line 5—5 thereof.

FIG. 6 is an enlarged view of a part of FIG. 5 showing in detail rib and wall communication means.

FIG. 7 is a partial front view in section of the double wall ribbed storage tank system taken along line 7—7 of FIG. 5.

DETAILED DESCRIPTION OF THE INVENTION

Figure 1:
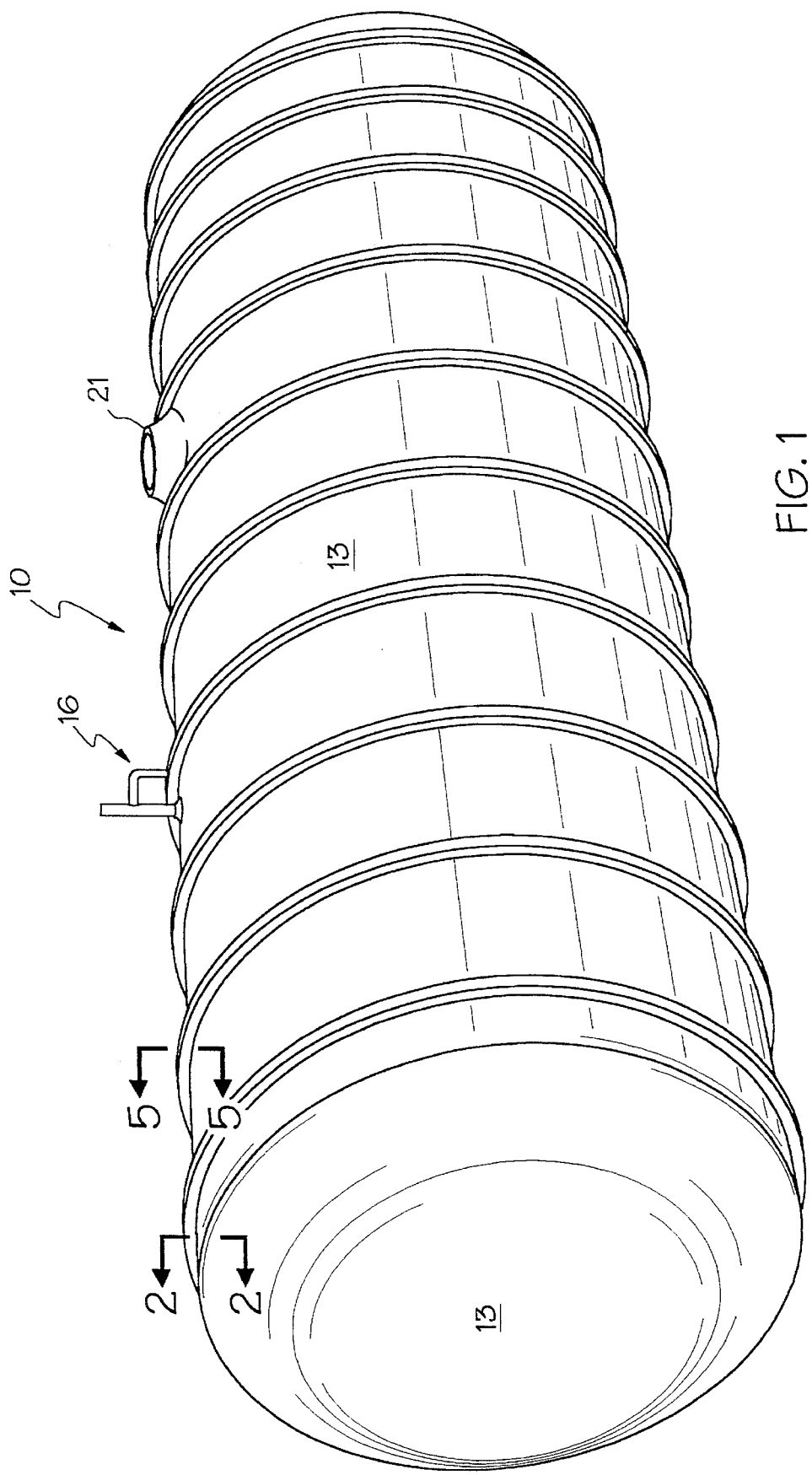
FIG. 1 is an environmental view of a double wall ribbed storage tank system of the invention.

With reference to FIG. 1 there is shown a double wall ribbed storage tank system of the invention. The illustrated storage tank system is intended for the underground storage of gasoline. Tank systems of the invention are as well useful for above ground storage of other liquids and such uses are contemplated. The advantages of the invention are most evident with those tank systems which are buried underground such as in gasoline service stations and, for this reason, the description to follow is directed to those tank systems.

As evident from FIGS. 1, 2 and 5, the double wall ribbed storage tank system 10 of the invention has an inner storage tank 11 with support ribs 12 and an outer wall 13. The outer wall 13 extends at least between the support ribs 12, over the end walls of the inner storage tank 11, and, as shown, can further extend over the support ribs 12. As used throughout, the inner storage tank is the primary tank and serves as the primary containment means for stored liquid. In construction of a double wall tank, the inner storage tank may be formed first or last depending on the mode of tank construction. Regardless of when formed, the inner storage tank is on the inside and the outer wall is on the outside.

Rib communication means 14 are operably associated with the support rib areas and wall communication means 15 are operably associated with secondary containment areas of the tank system. Each communication means is independent and each separately leads to a common monitoring station 16. The individual components of the double wall ribbed storage tank system 10 are described in more detail below as are the interactions of the components.

The inner storage tank 11 is cylindrical-shaped. It has a side wall 20 and dome-shaped end walls at each end of the side wall to form an enclosed primary storage area for stored liquid. A manway 21 is normally provided in the side wall 20 to access the tank system's interior. The storage tank 11 is made of a fibrous reinforced resinous material. Storage tanks of this general nature are well known and are commercially available. There are two FRP storage tank designs which are well known and commercialized. Both are usable in this invention. In one design, a cylindrical-shaped tank is initially formed on a collapsible mandrel. Support ribs are separately added and secured to the side wall of the tank. In another design, a removable mold is used. The mold is shaped such the side wall and ribs of the tank are formed together and are integral. Typically, two half-tanks, including its end wall, are separately made on the mandrel or mold and subsequently joined to form a full tank. The storage tank 11 shown in the figures represents the first design wherein the support ribs are separately added.

In accord with this invention, the storage tank 11 has the rib communication means 14 in the form of a porous strip 22 of material extending within the side wall 20 of the tank. Preferably, it extends the full length of the side wall. At least one porous strip is used. Typically a strip width of from about one inch to about six inches is used. Preferably, a porous strip extends along the bottom of the storage tank and along the top of the storage tank. Porous strips can as well extend along the sides of the storage tank for enhanced detection of support rib area structural failure. Synthetic fibrous materials and open-cell foams can be used to make the porous strips. Rib communication means in the form of an apertured tube and open-sided tube as well as any structure which allows a transmission for the purpose herein can be used.

As evident in FIG. 3, the porous strip 22 is embedded in the storage tank side wall 20. In formation of the side wall 20 and end walls, a first layer 23 of fibrous reinforced resinous material is formed, normally on a mandrel. While shown as a single layer for clarity purposes, the first layer 23 can represent several spray passes which eventually build to the depicted layer thickness. The porous strip 22 is properly positioned on the first layer. The strip's outer surface is preferably sealed to prevent resin penetration.

The balance of the side wall 20 and the support ribs 12 best illustrated in FIGS. 2 and 3 are formed together. Initially, a set of rib forms are positioned on the first layer 23 of the tank 11. As shown in FIGS. 5–7 a foam core 24 in the shape of a rib is placed on the tank so as to encircle it at spaced locations. Once positioned, fibrous material and resinous material are applied over the first layer 23 of the tank and the foam core 24 until a second layer 25 is obtained. The result is a storage tank 11 with a side wall 20 of desired total thickness and having a set of circumferentially spaced support ribs 12 secured thereto.

The rib communication means 14 is embedded in the side wall 20 of the storage tank 11 and is in direct contact with the support rib areas 26 within the support ribs 12 of the storage tank. As such, any structural failure in any of the support ribs 12 will be detectable and transmitted along the porous strip 22 as further discussed below.

The double wall ribbed storage tank systems 10 of the invention also has an independent wall communication means 15 to detect structural failure in secondary containment areas. With reference to FIGS. 2–7, another porous strip 27 of material is positioned along the length of the storage tank 11 on its outside surface, preferably including over the support ribs 12. The porous strip 27 also, preferably, extends the full length of the storage tank and extends at both ends into the two end wall areas. At least one porous strip along the top of the tank is used. Preferably, a porous strip along the bottom and the top of the storage tank is used. Most preferably, porous strips also extend along the sides of storage tank for enhanced detection capability. Alternative wall communication means as described above with respect to the rib communication means are also feasible.

A separating material 28 is positioned on the storage tank 11 between the support ribs 12, and on the end walls to ensure that the outer wall 13 is spaced off the inner storage tank 11. The structural spacing is needed to allow air or liquid to flow between the walls of the storage tank 11 and the outer wall 13. The outer wall 13 is formed over the separating material 28 in the side wall and end wall areas of the storage tank. Secondary containment areas are created by the outer wall. The secondary containment areas 29 between adjacent ribs are defined by the support ribs, the wall of the inner tank and the outer wall. The secondary containment areas 29 also include the space defined by an end-most support rib, the end wall of the inner storage tank and an outer wall over the inner storage tank's end wall. Preferably, the outer wall is attached to a side surface of each support rib 12 and extends thereover so as to benefit from the support rib strength. The outer wall 13 can as well be formed in a manner whereby it bonds to the top surface of the support rib or whereby it continues over the top surface of the support rib in a substantially unbonded manner.

Any structural failure in a side wall or end wall of the inner storage tank 11 or in the outer wall 13 will be detectable due to the wall communication means. Thus, the porous strip material 27 is used to transmit any detection of wall leakage to the monitoring station 16.

Figure 8:
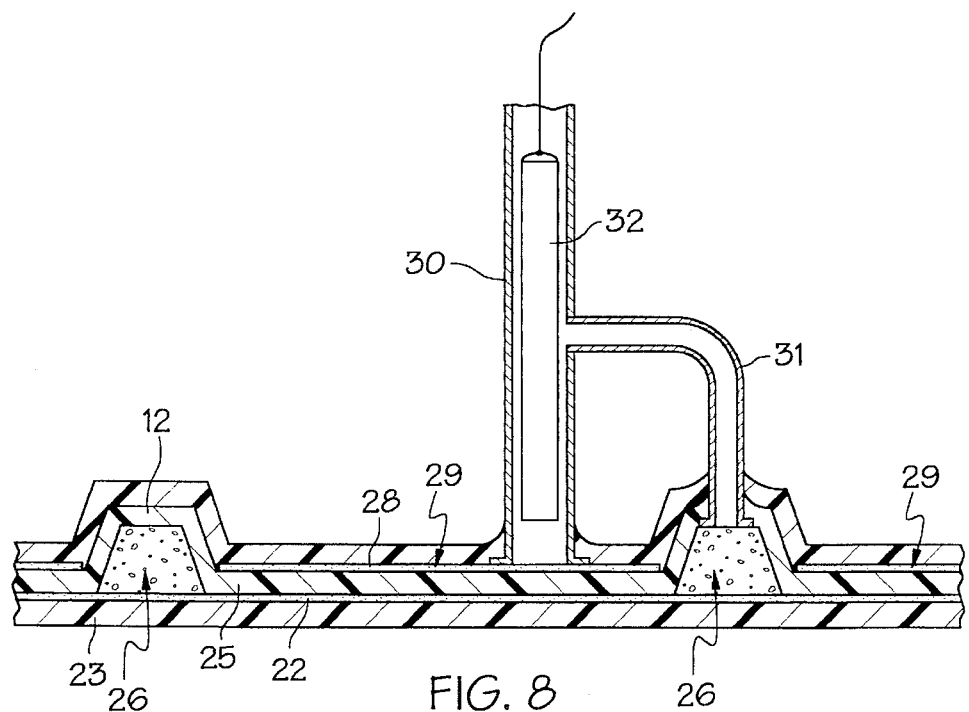
FIG. 8 is a partial front view in section of the double wall ribbed storage tank system of FIG. 1 showing a monitoring station for the rib and the wall communication means.

With reference to FIG. 8, the rib communication means and the wall communication means separately lead to the monitoring station 16. The monitoring station is able to identify a support rib area 26 or secondary containment area 29 structural failure and to identify which of the areas where the failure has occurred. A main standpipe 30 of the monitoring station is in communication with the porous strip 22 associated with the wall communication means 15. A secondary pipe 31 leads from the rib area and rib communication means 14 associated with the support ribs. Detection liquid fills the spaces between the inner tank and outer wall and independently fills the spaces enclosed by the support ribs. The detection liquid extends into the main standpipe 30 and secondary pipe 31 and to a level above the junction of the two pipes. It should be evident that any structural failure in the double wall ribbed storage tank system will affect the level of liquid in the standpipe. If the level drops to the junction point and remains there, the failure is in the support rib areas. If the level continues to drop below the junction point, the failure is in a wall of the inner storage tank or in the outer wall. A float rod 32 facilitates the detection. Remedial action is taken as needed.

Figure 9:
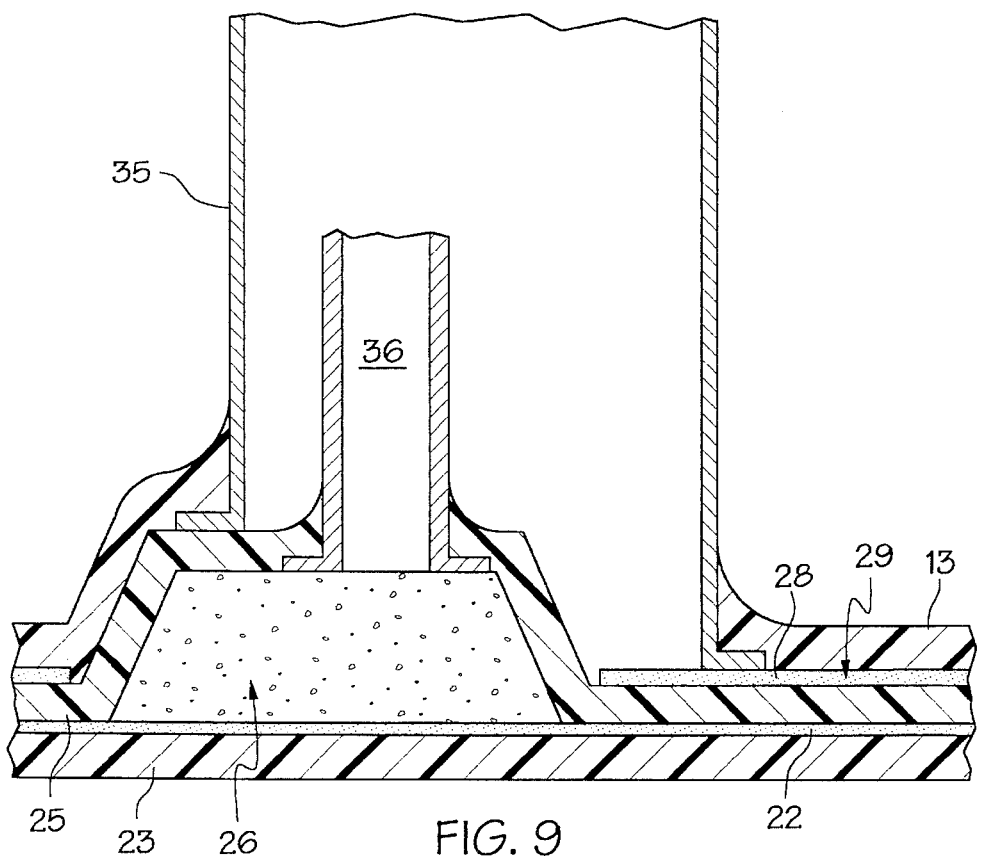
FIG. 9 is a partial front view in section of another monitoring station for the rib communication and the wall communication means of the double wall ribbed storage tank system of the invention.

FIG. 9 illustrates an alternative monitoring station for use with a double wall ribbed storage tank system of the invention. The tank system illustrated is made in a manner similar in all regards to the system of FIGS. 1 and 8 except for use of a different monitoring station. As shown, a main standpipe 35 is secured to the outer wall 13 of the tank system 10 so as to be in direct communication with a support rib area and a secondary containment area. The area within the support rib is accessed by a secondary pipe 36 extending through a top wall of the support rib. Similarly, a portion of the outer wall within the area to be encompassed by the standpipe 35 is stripped away to bare the separating material 28. As such the standpipe is in direct communication with (1) the inside of one support rib and, through the rib communication means 14, all the other support rib areas and (2) the secondary containment area and, through the wall communication means 15, the other secondary containment areas.

In use, the standpipe of the FIG. 9 embodiment has liquid added until the support rib areas and areas between the inner tank and outer wall are filled. The liquid level at normality will extend above the secondary pipe 36. Any leakage in one of the support rib areas will cause the liquid to drain down to the top of the secondary pipe 36. Any leakage in the balance of the tank system will cause the liquid level to drop in the standpipe 35 to below the secondary pipe 36.

A monitoring station where one access pipe leads to the rib communication means and another access pipe standing alone leads to the wall communication means of the storage tank system of the invention is also feasible. The two access pipes are separately connected to signaling devices to signal a structural failure in the system.

Various other leak detection means are used with all the above described monitoring stations. For example, the support rib areas and secondary containment areas can be maintained under a non-atmospheric condition and a pressure change indicator used.

Various liquid and/or gaseous probes and analyzers can be used to monitor the aforementioned areas. Any known leak detector means can be used in the double wall ribbed storage tank system of the invention. Further, each detection means can be electronically linked with an alarm system to audibly or visually warn of a pre-set set significant change in either of the two monitored areas.

While the invention has been described in detail and with particular reference to the drawings, it should be apparent that various changes can be made. All changes or modifications of an obvious nature to the described invention are considered within the scope of the appended claims.

I claim:

1. A double wall ribbed storage tank system for independently monitoring support rib areas for leakage and secondary containment areas for leakage, said storage tank system comprising:

(a) an inner storage tank having side walls and end walls to form an enclosed primary storage space for stored liquid and further having a set of support ribs extending around the side walls at spaced intervals to create support rib areas encompassed by the support ribs and to add strength to said inner storage tank;

(b) an outer wall extending over the inner storage tank to create secondary containment areas between adjacent support ribs and over the end walls for the stored liquid;

(c) an independent rib fluid communication means which fluidally connects together the support rib areas;

(d) an independent wall fluid communication means which fluidally connects together the secondary containment areas; and (e) a monitoring station operably associated with the independent rib fluid communication means and the independent wall fluid communication means to identify a structural failure in a support rib from a structural failure in the side wall or end walls of the inner storage tank or in the outer wall.

2. The double wall ribbed storage tank system of claim 1 wherein the rib fluid communication means is a strip of a porous material which extends along the length of the inner storage tank whereby a structural failure in a support rib is capable of being detected through said rib fluid communication means.

3. The double wall ribbed storage tank system of claim 1 wherein the wall fluid communication means is a strip of a porous material which extends along the length of the inner storage tank whereby a structural failure in a wall of the inner storage tank or in the outer wall is capable of being detected through said wall fluid communication means.

4. The double wall ribbed storage tank system of claim 1 wherein the inner storage tank is cylindrical-shaped and the support ribs extend circumferentially therearound.

5. The double wall ribbed storage tank system of claim 4 wherein the support ribs are substantially uniformly spaced along the inner storage tank at on-center spacings of about twelve inches to about eighteen inches.

6. The double wall ribbed storage tank system of claim 1 wherein the inner storage tank and the outer wall are each made of a fibrous reinforced resinous material.

7. The double wall ribbed storage tank system of claim 1 further wherein an access pipe operably associated with the rib fluid communication means and an access pipe operably associated with the wall fluid communication means each lead to the monitoring station whereby a failure in either (i) the support ribs or (ii) the walls of the inner storage tank or the outer wall is independently discernable.

8. The double wall ribbed storage tank system of claim 1 wherein the support ribs are an integral part of the inner storage tank.

9. The double wall ribbed storage tank system of claim 1 wherein the support ribs are positioned on the side walls of the inner storage tank and secured thereto.

10. A double wall ribbed storage tank system for independently monitoring support rib areas for leakage and secondary containment areas for leakage, said storage tank system comprising:

(a) an inner storage tank having a cylindrical-shaped side wall and end walls to form an enclosed primary storage space for stored liquid and further having substantially uniformly spaced support ribs extending around the side wall to create support rib areas encompassed by the support ribs and to add strength to said inner storage tank;

(b) an outer wall extending over the inner storage tank to create secondary containment areas for the stored liquid between adjacent support ribs, the side wall of the inner storage tank and said outer wall and secondary containment areas between each end wall of the inner storage tank and said outer wall;

(c) an independent rib fluid communication means which fluidally connects together the support rib areas;

(d) an independent wall fluid communication means which fluidally connects together the secondary containment areas; and (e) a monitoring station operably associated with the rib fluid communication means to identify a structural failure in a support rib and operably associated with the wall fluid communication means to identify a structural failure in the side wall or end walls of the inner storage tank or in the outer wall.

11. The double wall ribbed storage tank system of claim 10 wherein the rib fluid communication means is a strip of a porous material which extends along the length of the inner storage tank whereby a structural failure in a support rib is capable of being detected through said rib fluid communication means.

12. The double wall ribbed storage tank system of claim 11 wherein the wall fluid communication means is a strip of a porous material which extends along the length of the inner storage tank whereby a structural failure in the side wall or end walls of the inner tank or in the outer wall is capable of being detected through said wall fluid communication means.

13. The double wall ribbed storage tank system of claim 10 wherein the support ribs are substantially uniformly spaced along the inner storage tank at on-center spacings of about twelve inches to about eighteen inches.

14. The double wall ribbed storage tank system of claim 10 wherein the inner storage tank and the outer wall are each made of a fibrous reinforced resinous material.

15. The double wall ribbed storage tank system of claim 10 further wherein an access pipe operably associated with the rib fluid communication means and an access pipe operably associated with the wall fluid communication means each lead to the monitoring station whereby a failure in either (i) the support ribs or (ii) the walls of the inner storage tank or the outer wall is independently discernable.

\* \* \* \* \*